W. STRAIT.
POTATO DIGGER.
APPLICATION FILED JAN. 18, 1908.
910,601.
Patented Jan. 26, 1909.
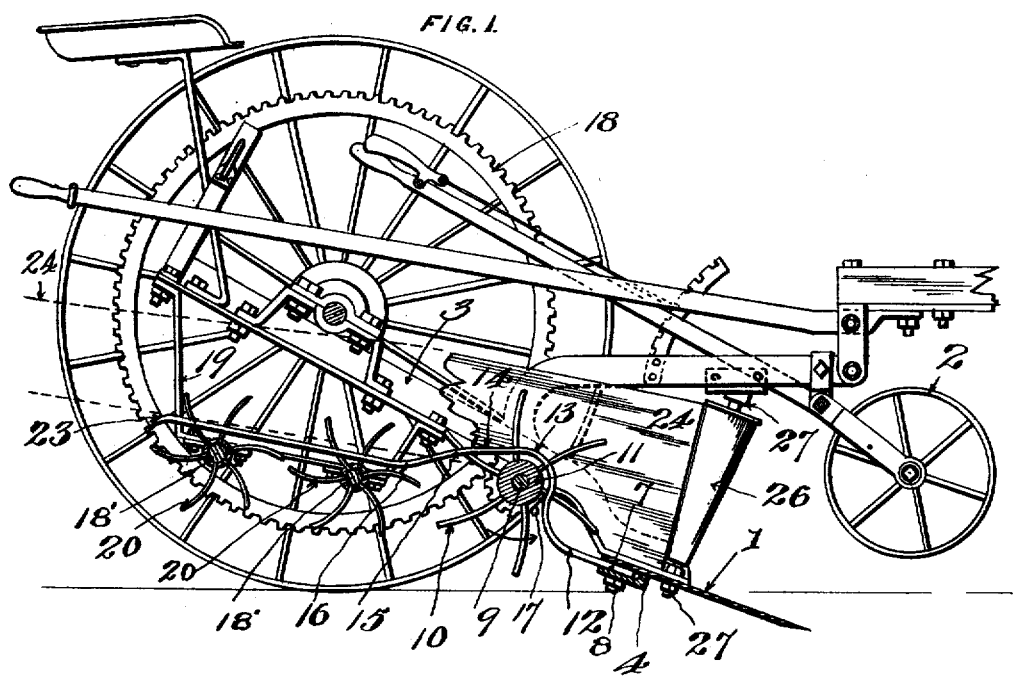
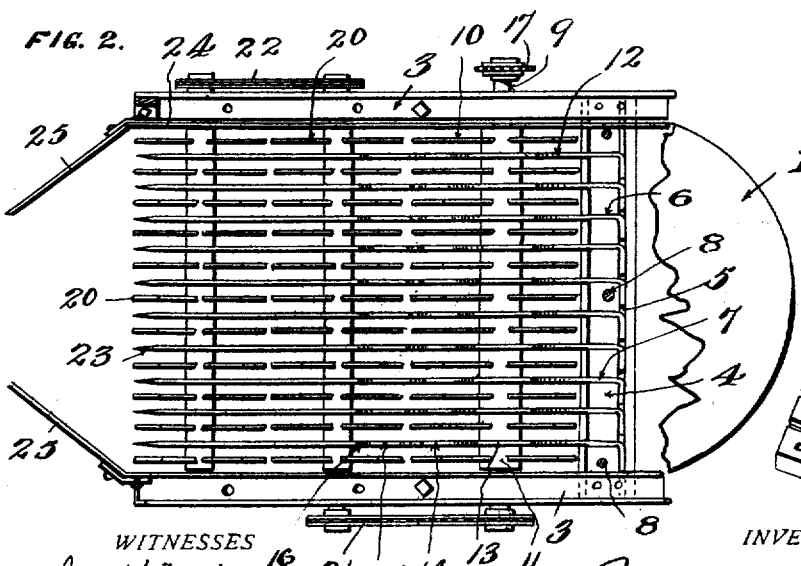
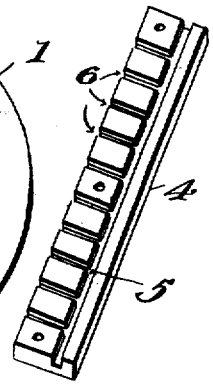
WITNESSES
Chas. K. Davis
Ella L. Corbett
INVENTOR
William Strait
by Brock, Becker & Smith
Attorneys

UNITED STATES PATENT OFFICE.

WILLIAM STRAIT, OF EAU CLAIRE, WISCONSIN.

POTATO-DIGGER.

No. 910,601.　　　Specification of Letters Patent.　　　Patented Jan. 26, 1909.

Application filed January 18, 1908. Serial No. 411,417.

*To all whom it may concern:*

Be it known that I, WILLIAM STRAIT, a citizen of the United States, residing at Eau Claire, in the State of Wisconsin, have invented a new and useful Potato Digger, of which the following is a specification.

My invention relates to digging machines for separating vegetables such as potatoes from the soil.

Among the particular objects of the invention are to carry the shovel at an acute angle to the horizontal so that earth is readily elevated by it; to support the shafts of the rotary separators quite a distance above the ground to permit the separator arms being made long, and a peculiar shaping of the grid or carrier which supports the earth and potatoes and of the separator arms to avoid pinching and crushing the potatoes.

In the accompanying drawings an exemplifying form of the invention is shown.

Figure 1 is a longitudinal section through a digger; Fig. 2 is a plan of the grid or carrier showing the side boards and separators and driving means therefor, most of the other parts being removed or broken away, and Fig. 3 is a detail view of the forward support for the carrier rods.

The general construction of the machine may be widely varied. The details of the running gear will not be particularly described.

The shovel 1 is carried as shown at an acute angle to the horizontal. The angle of the shovel may be varied by shifting the axis of the front wheel 2 in a manner well understood in the art. The shovel is carried by angle irons 3 which also support the grid. Below the rear end of the shovel is a bar 4, having a lengthwise groove 5 and transverse grooves 6. The grid is composed of rods 7, the front ends of which are bent at right angles. The rods are laid in grooves 6 with their bent ends all turned one way in groove 5. After the rods are in place the shovel is put over them and secured to bar 4 by bolts 8. The shovel holds the rods in place. Bar 4 is secured to angle irons 3.

A short distance to the rear of the shovel and at considerable elevation above the ground, is the shaft 9 of the forward separator. This separator, as a whole, is sometimes called a reel. The elevation of shaft 9 permits making the separator arms 10, which are secured to hub 11, of practically any desired length. Rods 7 which are spaced close enough together to prevent the passage between them of the smaller sized potatoes are bent upward at 12, are curved at 13 to conform quite closely to hub 11 of the forward reel and are curved slightly downward from 14 back of the center of the reel to the point 16. The arms or blades 10 of the separator are curved more or less as shown, the convexity of the curve being in the direction of rotation of the reel. The reel is revolved by means of a pinion 17 secured to shaft 9 engaging a large gear 18 carried by one of the wheels.

As the digger is pulled forward the shovel raises the earth containing the potatoes and they are forced by the movement of the digger easily up the slightly inclined shovel until they encounter the blades 10 of the forward reel, which extend between the bars of the grid. The earth is broken up at this point and a large part of it drops at once through the grid at point 12. The remainder of the earth with the potatoes is elevated by blades 10 to the main portion of the grid and is impelled backward by blades 10, the blades all the time stirring up and breaking the earth, which drops through the grid. The mass is shoved back of the center of the reel by the blades; and in this further movement pinching of the potatoes between the blades and the grid is prevented by the novel and peculiar shaping of the blades and the grid itself. The grid is curved slightly downward as shown and this curvature, with the convex curvature of the blades, causes the angle between the blades and the grid at any point to be quite large so that the potatoes are handled with minimum damage. There is no pinching or bruising of the vegetables. The digger will operate quite successfully with a single reel but in order to insure a thorough clearing of the earth from the vegetables, rods 7 are continued back and one or more additional reels 18' added. These reels are carried by shafts journaled in a bracket 19 suspended from angle-bars 3. The blades 20 of each of the added reels are curved in a similar manner to blades 10 to prevent pinching the potatoes. The forward reel 18' is impelled by a chain 21 passing over sprockets on shaft 9 and the shaft of reel 18' and the rear reel 18' is impelled in a similar manner by a chain 22 and sprockets carried by the shafts of the two rear reels. The potatoes and earth leaving the forward reel are caught by the first of reels 18' and moved further back on the grid and the rearmost reel then takes the mass and clears whatever dirt may remain from the potatoes and discharges the potatoes at the rear end of the grid. The rods at their rear ends are curved downward as at 23 to prevent scratching or breaking the potatoes as they drop to the surface of the ground.

During their passage over the grid the potatoes are guided by side boards 24, one of which is supported at each side of the grid by angle bars 3. At the rear ends the side boards are turned inward as at 25 so that the vegetables are discharged in a compact row and may be easily taken up. In front of the forward end of each side board 1 support a roller 26 which is revolubly mounted in bearings 27 carried by the frame and angle bars 3. If these rollers are omitted masses or clods of earth have a tendency to hang on the ends of the boards and unduly retard the machine. With the rollers in position, however, these clods or masses of earth easily turn upon the rollers and pass up onto the shovel or swing to one side and remain on the ground.

Variations in construction may be made without departing from the spirit of my invention.

I claim:—

1. The combination with running gear of a shovel carried at a slight angle to the horizontal, a separator reel revolubly mounted behind and considerably above the plane of the shovel, and one or more additional separator reels revolubly mounted behind the first, the reels being provided with blades, and a grid comprising bars arranged between the blades extending rearwardly from the shovel and thence upwardly to approximately the center line of the first reel, the grid then being curved about the first reel to a point approximately above its shaft-center, the grid then being curved downwardly toward the second reel and thence continuing rearwardly over the reels, and means for rotating the reels.

2. The combination of a frame, wheels thereon, a shovel carried by the frame at a slight angle to the horizontal, a separator reel revolubly mounted behind and considerably above the plane of the shovel and one or more additional separator reels revolubly mounted behind the first, the reels being provided with blades, a grid comprising bars arranged between the blades extending rearwardly from the shovel and thence upwardly to approximately the center line of the first reel, the grid then being curved about the first reel to a point approximately above its shaft center, the grid then being curved downwardly toward the second reel and thence continuing rearwardly over the reels, gearing connecting the first reel with one of the wheels and driving connections between the first reel and the other reels.

3. The combination of a frame having side members downwardly curved at the front, wheels, a shovel carried by the front ends of the side members at a slight angle to the horizontal, a separator reel revolubly mounted on the side frame members back of the curved portion so that they are behind and considerably above the plane of the shovel and one or more additional separator reels revolubly mounted behind the first, the reels being provided with blades and a grid comprising bars arranged between the blades extending rearwardly from the shovel and thence upwardly to approximately the center line of the first reel, the grid then being curved about the first reel to a point approximately above its shaft center, the grid then being curved downwardly toward the center reel and thence continuing substantially straight to the rear end, and gearing connecting the reels with one of the wheels.

WM. STRAIT.

Witnesses:
B. P. Mosher,
Arthur Linton.